United States Patent
Zeoli

[19]
[11] Patent Number: 6,086,158
[45] Date of Patent: Jul. 11, 2000

[54] PADDED CUSHIONING DEVICE

[76] Inventor: Dorothy Zeoli, 240-15 137th Ave., Rosedale, N.Y. 11422

[21] Appl. No.: 09/369,782

[22] Filed: Aug. 6, 1999

[51] Int. Cl.[7] .................................................. B60R 22/10
[52] U.S. Cl. ........................................ 297/482; 297/483
[58] Field of Search .................................. 297/482, 483, 297/488, 487

[56] References Cited

U.S. PATENT DOCUMENTS

| | | |
|---|---|---|
| D. 274,587 | 7/1984 | Gilkes . |
| 3,386,103 | 6/1968 | Robinson . |
| 4,461,510 | 7/1984 | Cunningham et al. . |
| 4,886,318 | 12/1989 | Pennock ................................... 297/482 |
| 5,005,866 | 4/1991 | Reedom . |
| 5,016,915 | 5/1991 | Perry . |
| 5,080,441 | 1/1992 | Stevenson et al. . |
| 5,213,366 | 5/1993 | Sweger, Jr. ........................... 297/483 X |
| 5,275,468 | 1/1994 | Vacanti ................................. 297/482 X |
| 5,322,349 | 6/1994 | Gianino . |
| 5,335,957 | 8/1994 | Golder . |
| 5,421,614 | 6/1995 | Zheng ................................... 297/482 X |
| 5,429,418 | 7/1995 | Lipper et al. ......................... 297/483 X |

*Primary Examiner*—Peter R. Brown
*Attorney, Agent, or Firm*—Michael I. Kroll

[57] ABSTRACT

A padded cushioning device for use with a child strapped into a car seat by a seat belt having a buckle, an abdominal restraint strap and a chest restrain strap. The device comprising a cushion. A first means is for releasably attaching a portion of the abdominal restraint strap of the seat belt to the cushion, so that when the buckle of the seat belt is engaged, the cushion will be held against an abdominal area of the child in a comfortable manner when the child is seated in the car seat. A second means is for releasably attaching a portion of the chest restraint strap of the seat belt to the cushion, so that the chest restraint strap will be positioned away from a neck of the child to eliminate uncomfortable chaffing of the skin on the neck.

1 Claim, 6 Drawing Sheets

PADDED CUSHIONING DEVICE

BACKGROUND OF THE INVENTION

1. Field of the Invention

The present invention relates generally to pillows used as cushioning devices and, more specifically, to a padded cushioning device to be used in strapping a child in a car seat with a seat belt. The device is selectively positioned on the child' abdominal area. The seat belt is comprised of one or two straps secured and locked into a buckle. The padded cushioning device contains two flaps each having one mating length of hook and loop fastening elements attached to a cushion of the padded cushioning device. The mating portion of hook and loop fastening elements attached adjacent to a free end of each of the flaps provides means for closure and securement of the flaps to the cushion of the padded cushioning device, so it can be used as means for selectively securing the padded cushioning device to the seat belt. When both flaps are opened the abdominal restraint strap of the seat belt is placed under the lower flap and the lower flap secured to the mating portion of the hook and loop material on the cushion. The chest restraint strap of the seat belt is then placed under the upper flap and the upper flap secured to the mating portion of hook and loop material on the cushion.

The padded cushioning device is positioned on the seat belt so that the flap will encompass a portion of the straps of the seat belt, are not fixedly attached to the seat belt and can be selectively positioned to a comfortable location for the child. The seat belt does not cut into the child and should the condition arise, the surface area of the restraint straps will be dissipated over a larger surface becoming a variable of the size of the cushion and density of the padding material.

In general, a first field of use of the disclosed invention is by automobile drivers as the most likely benefactors of the unique advantages of the instant invention. However, many other fields, such as buses, trucks, railroads, airlines, could find potentially beneficial uses of this invention.

Thus, it can be seen that the potential fields of use for this invention are myriad and the particular preferred embodiments described herein is in no way meant to limit the use of the invention to the particular field chosen for exposition of the details of the invention.

A comprehensive listing of all the possible fields to which this invention may be applied is limited only by the imagination and is, therefore, not provided herein. Some of the more obvious applications are mentioned in the interest of providing a full and complete disclosure of the unique properties of this previously unknown general purpose article of manufacture. It is to be understood from the outset that the scope of this invention is not limited to these fields or to the specific examples of potential uses presented herein.

2. Description of the Prior Art

Numerous types of padded cushioning devices designed for restraining systems have been provided in the prior art. For example, U.S. Pat. no. 3,386,103 issued to Robinson on Jun. 4, 1968; U.S. Pat. No. 4,461,510 issued to Cunningham et al. On Jul. 24, 1984; U.S. Pat. No. 5,005,886 issued to Reedom on Apr. 9, 1991; U.S. Pat. No. 5,016,915 issued to Perry on May 21, 1991; U.S. Pat. No. 5,080,441 issued to Stevenson et al. On Jan. 14, 1992; U.S. Pat. No. 5,322,349 issued to Gianino on Jun. 21, 1994; U.S. Pat. No. 5,335,957 issued to Golder on Aug. 9, 1994 and U.S. Pat. No. Des. 274,587 issued to Gilkes on Jul. 10, 1984 all are illustrative of such prior art. While these units may be suitable for the particular purpose to which they address, they would not be as suitable for the purposes of the present invention as heretofore described.

This United States patent discloses a pad for cushioning the impact of vehicular seat belts against occupants during accidents. The pad comprises an elongated hollow body of cushioning material. The body being provided with open ends for insuring passage of the seat belt therethrough and opposed longitudinal shoulder vertical portions connecting the end portions of the body as well as confining the belt laterally. The midportion of the body being provided with a cut-out portion permitting access to the buckle of the belt for fastening and removal. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

A safely device for enabling a child to use an adult vehicle safety belt of the type having a shoulder strap and a lap strap consists of a cushion having a respective belt retainer on each side thereof, under which the lap strap of the adult safety belt engages. An auxiliary strap is attached to the cushion so as to extend from the back thereof and has a belt guide connector secured to its free end. In use, the belt guide connector slidably receives the shoulder strap of the adult belt so that the shoulder straps extends in front of, and the auxiliary strap extends behind the child's torso with the belt guide connector located above the child's shoulder. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

Novel seat belt cushions in the form of people, places, things, birds, animals and in particular animals such as bunnies, bears, and pandas. These cushions may be constructed with a plurality of sections, limbs, and objects and may be adapted with electronic devices or the like. The cushions are constructed of one or more sheets of foam padding encased by a cotton or synthetic fiber outer layer. In a preferred embodiment, lighting effects, small battery powered lights, preferably which provide representations or replicas of monuments, map layouts and other recreations may be employed in the cushions. Further, audio output, electronic circuits or miniature tape players for projecting audible messages such as safety tips may be employed. The sections and the objects are secured to the cushion by means of fasteners, preferably mating fiber fasteners such as the "Velcro" fasteners. The novel cushions are secured to a seat belt by folding around seat belt, much in the nature of a book. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

A child restraint for use with an automobile seat belt including an elongated cushion having attachment loops for attachment to a seat belt and sized to engage about a child filling voids between the child, the seat and the seat belt on opposite sides of the child. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

An airline safety seat is provided having a lap bolster for use adjacent a minor, such as a child. A retractor system consisting of two tension straps are connected to a male buckle adapter so that they may be pulled at the same rate as the pass over the head of a user and then buckled between the legs of the user. The tension straps are designed so that they may be fully extended without tension pull to engage a snapping pull so that they may retract and encompass a user thereof. These tension straps are connected to inertial rollers or reels mounted inside the lap bolster. The rollers on reels are suitably mounted. A buckle system is retracted into the lap bolster by the two inertial rollers or wheels. A male adapter system is pulled over the user's head and down the back to be buckled between the legs of the user to meet a female attachment. The female attachment extends approximately one inch out of the lap bolster. The portion inside the lap bolster is provided with a metal weight rolled at the end and a metal plate with three bolts preceding it to hold the system to the hard front face plastic. The metal weight at the end ensures a firm hold of the system. A strap retainer is provided to hold the straps close together and in place at the upper back of a user. The retainer is adjustable on the straps as desired. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

A seat belt cushion apparatus with removable padding is disclosed. The apparatus includes an envelope having an elongated case with an interior compartment formed therein and a flap carried by the case for selectively opening and closing the compartment. A distal portion of the flap is releasably fastened to the case to retain the flap in a closed condition. Padding is removably received by the compartment when the flap is open. The case is generally aligned with and engaged with the seat belt on a side of the seat belt that generally faces the user of the belt and the flap is wrapped about the opposite side of the seat belt and fastened closed to secure the apparatus to the seat belt. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

An improved restraint device is provided which is characterized by its relative ease of use and comfort to occupants while provided effective and enhanced protection to occupants of motor vehicles or the like. The restraint device includes an open ended tubular guide member which is generally cylindrical or elliptical in cross-section and in which the interior surfaces of the tubular member define a longitudinal passageway for receiving and engaging portions of both the shoulder harness and lap portions of a three-point vehicular restraint system. The guide member exerts a laterally displacing force on the shoulder harness portion of a three-point restraint system to re-orient the shoulder belt for use by adults of relatively small stature or children. In this matter, the repositioning of the shoulder belt for use by children in particular may be accomplished without adversely displacing the relative position of the lap belt particularly during impact conditions. The advantages of the restraint device are accomplished without adversely affecting the automatic adjustment capabilities of the existing automotive restrain apparatus or without requiring extensive modifications to the existing restraint. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

This United States Patent discloses an ornamental design for a cushion for use by a child in conjunction with an adult vehicle safety belt as illustrated in the drawings of the patent. The present invention is completely different than this patent, in that the padded cushioning device consists of a cushion with two flaps with mating hook and loop fastening elements therebetween. The lower flap engages with an abdominal restraint strap of a seat belt, while the upper flap engages with a chest restraint strap of the seat belt. The padded cushioning device can be selectively positioned to a comfortable location for the child.

None of the above inventions and patents, taken either singly or in combination, is seen to describe the instant invention as claimed.

SUMMARY OF THE PRESENT INVENTION

The present invention relates generally to pillows used as cushioning devices and, more specifically, to a padded cushioning device to be used in strapping a child in a car seat with a seat belt.

A primary object of the present invention is to provide a padded cushioning device that will overcome the shortcomings of prior art devices.

Another object of the present invention is to provide a padded cushioning device which is easily attached to a seat belt having an abdominal restraint strap and/or a chest restraint strap.

An additional object of the present invention is to provide a padded cushioning device which will prevent the seat belt from cutting into the abdomen causing discomfort and also from irritating the skin around the neck.

Still yet another object of the present invention is to provide a padded cushioning device which will fill up gaps of an ill-fitting seat belt.

Yet another object of the present invention is to provide a padded cushioning device containing a number of flaps having hook and loop material attached adjacent to the edges of the flaps and having the mating hook and loop fastening elements attached to a front surface of a cushion of the device wherein the flaps can be used to slidably encompass a portion of a seat belt having an abdominal straps and/or a chest restraint strap.

A further object of the present invention is to provide a padded cushioning device that is simple and easy to use.

A still further object of the present invention is to provide a padded cushioning device that is economical to manufacture.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

The present invention overcomes the shortcomings of the prior art by providing a padded cushioning device that is used in strapping a child in a car seat with a seat belt. The device is selectively positioned on the child's abdominal area. The seat belt is comprised of an abdominal restraint strap and/or a chest restraint strap. The padded cushioning device, contains two flaps each having hook and loop fastening elements attached adjacent to free ends of the flaps and the mating portion of hook and loop fastening elements attached to a cushion of the device thereby providing means for inserting the abdominal restraint strap under one flap and the chest restraint strap under the other flap therein securing the padded cushioning device to the seat belt. The padded cushioning device is positioned on the seat belt so that the flaps will encompass a portion of the straps of the seat belt, are not fixedly attached to the seat belt and can be selectively positioned to a comfortable location for the child, whereby the seat belt does not cut into the child. For sanitary purposes the device is 100% machine wash and dry.

The foregoing and other objects and advantages will appear from the description to follow. In the description reference is made to the accompanying drawing, in which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the FIGS. 1 through 6 illustrate padded cushioning device of the present invention. With regard to the reference numerals used, the following numbering is used throughout the various drawing figures.

10 padded cushioning device
12 child
14 car seat
16 seat belt
18 buckle of seat belt
20 abdominal restraint strap of seat belt
22 chest restraint strap of seat belt
24 cushion
26 first releasably attaching means
28 abdominal area of child
30 second releasably attaching means
32 neck of child
34 resilient padding material of cushion
36 casing of cushion
38 front face of casing
40 rear face of casing
42 lower flap
44 first end of lower flap
46 top seam edge of cushion
48 hook fastening element
50 loop fastening element
52 inner face of lower flap
54 second free end of lower flap
56 upper flap
58 first end of upper flap
60 hook fastening element
62 loop fastening element
64 inner face of upper flap
66 second free end of upper flap

DETAILED DESCRIPTION OF THE PREFERRED EMBODIMENT

Turning now descriptively to the drawings, in which similar reference characters denote similar elements throughout the several views, FIGS. 1 through 6 illustrate the various components of the present invention being a padded cushioning device 10 for use with a child 12 strapped into a car seat 14 by a seat belt 16 having a buckle 18, an abdominal restraint strap 20 and a chest restraint strap 22. Device 10 comprises a cushion 24. A first means 26 is for releasably attaching a portion of abdominal restraint strap 20 of seat belt 16 to cushion 24, so that when buckle 18 of seat belt 16 is engaged, cushion 24 will be held against an abdominal area 28 of child 12 in a comfortable manner when child 12 is seated in car seat 14. A second means 30 is for releasably attaching a portion of chest restraint strap 22 of seat belt 16 to cushion 24, so that chest restraint strap 22 will be positioned away from a neck 32 of child 12 to eliminate uncomfortable chaffing of the skin on the neck 32.

Figure 1:
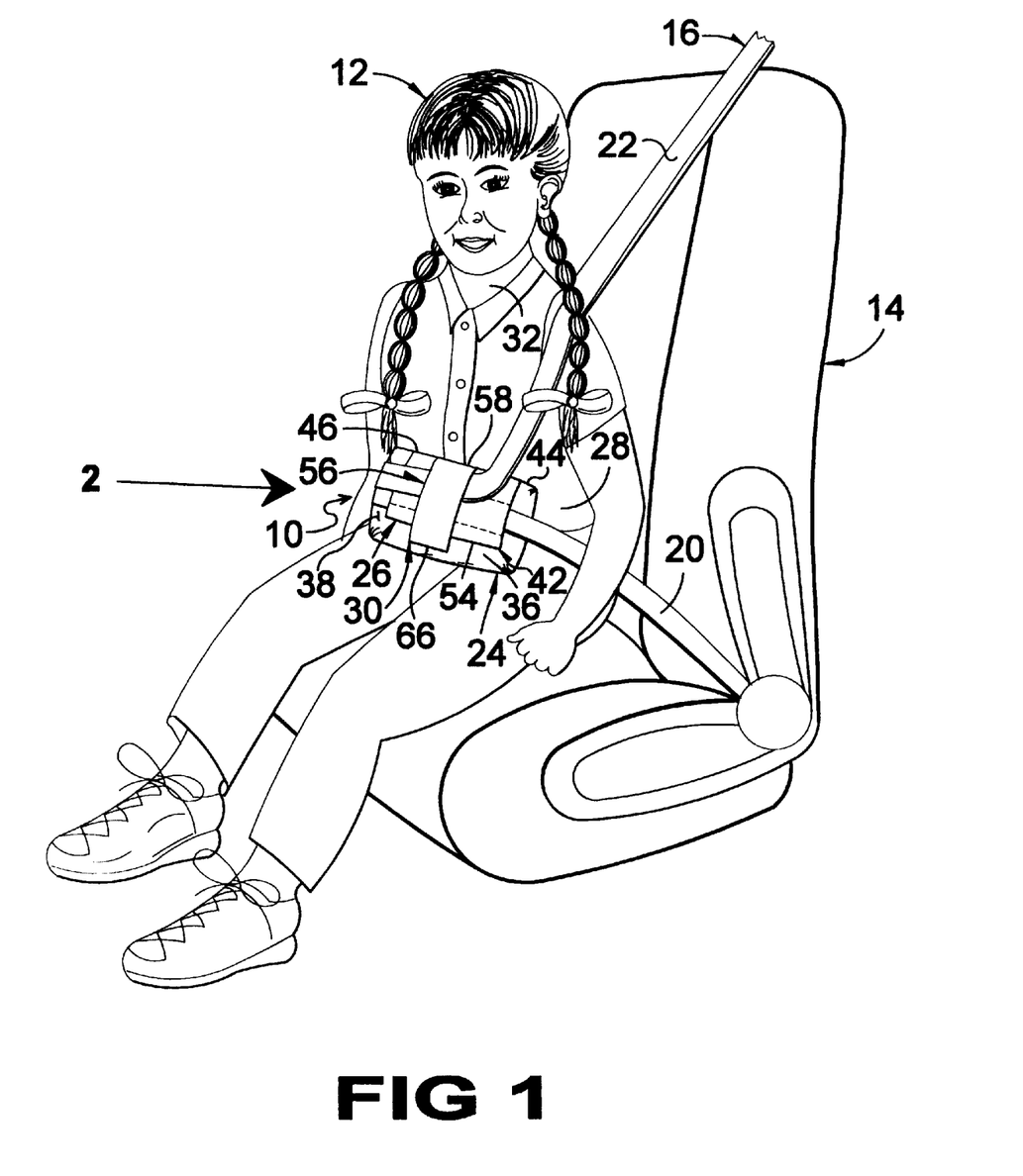
FIG. 1 is a perspective view of a child strapped into a car seat by a seat belt with the present invention installed in place.
Figure 2:
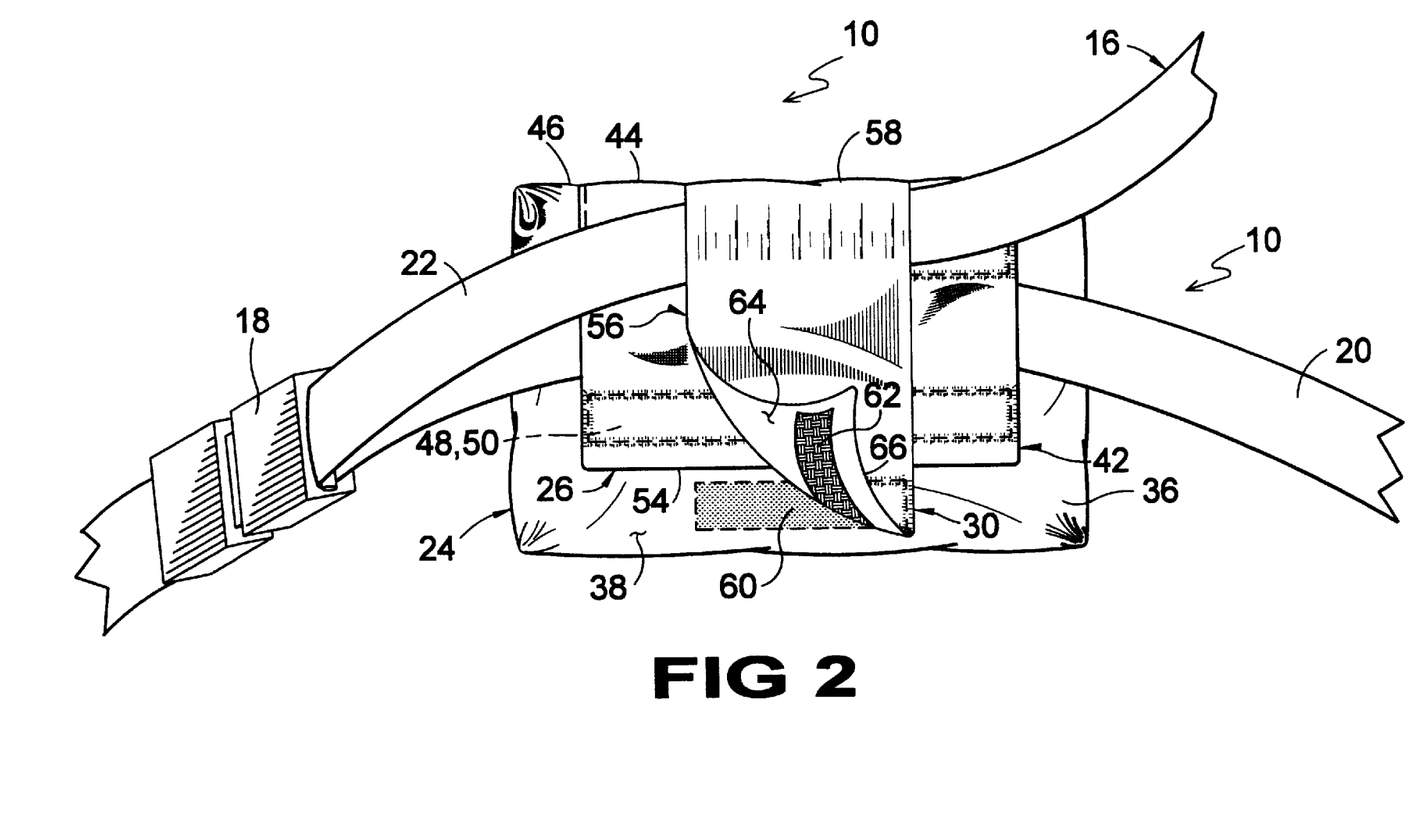
FIG. 2 is a front view taken in the direction of arrow 2 in FIG. 1 with parts broken away.
Figure 3:
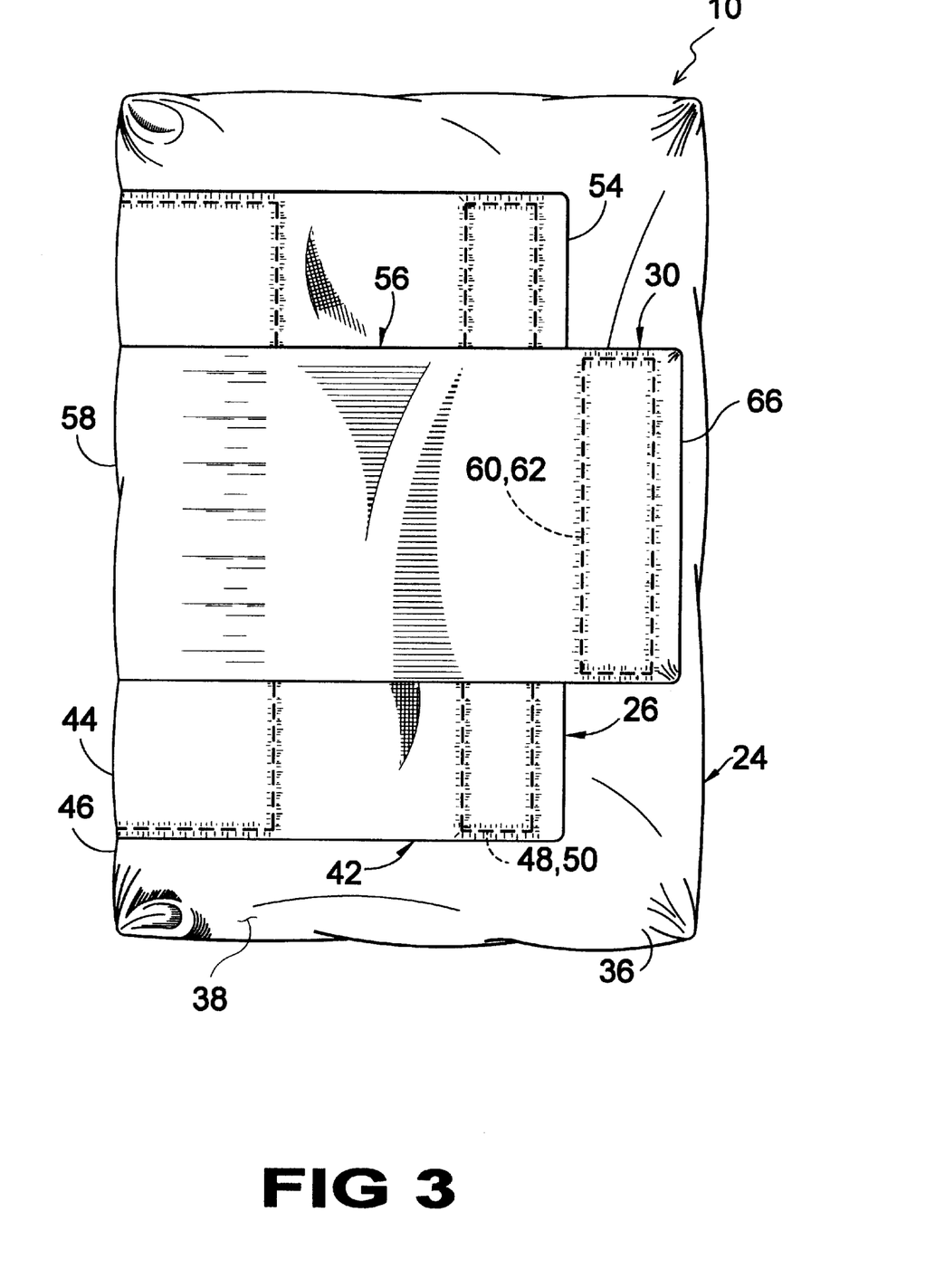
FIG. 3 is a front view of the present invention per se with both the upper flap and lower flap closed upon the cushion.
Figure 4:
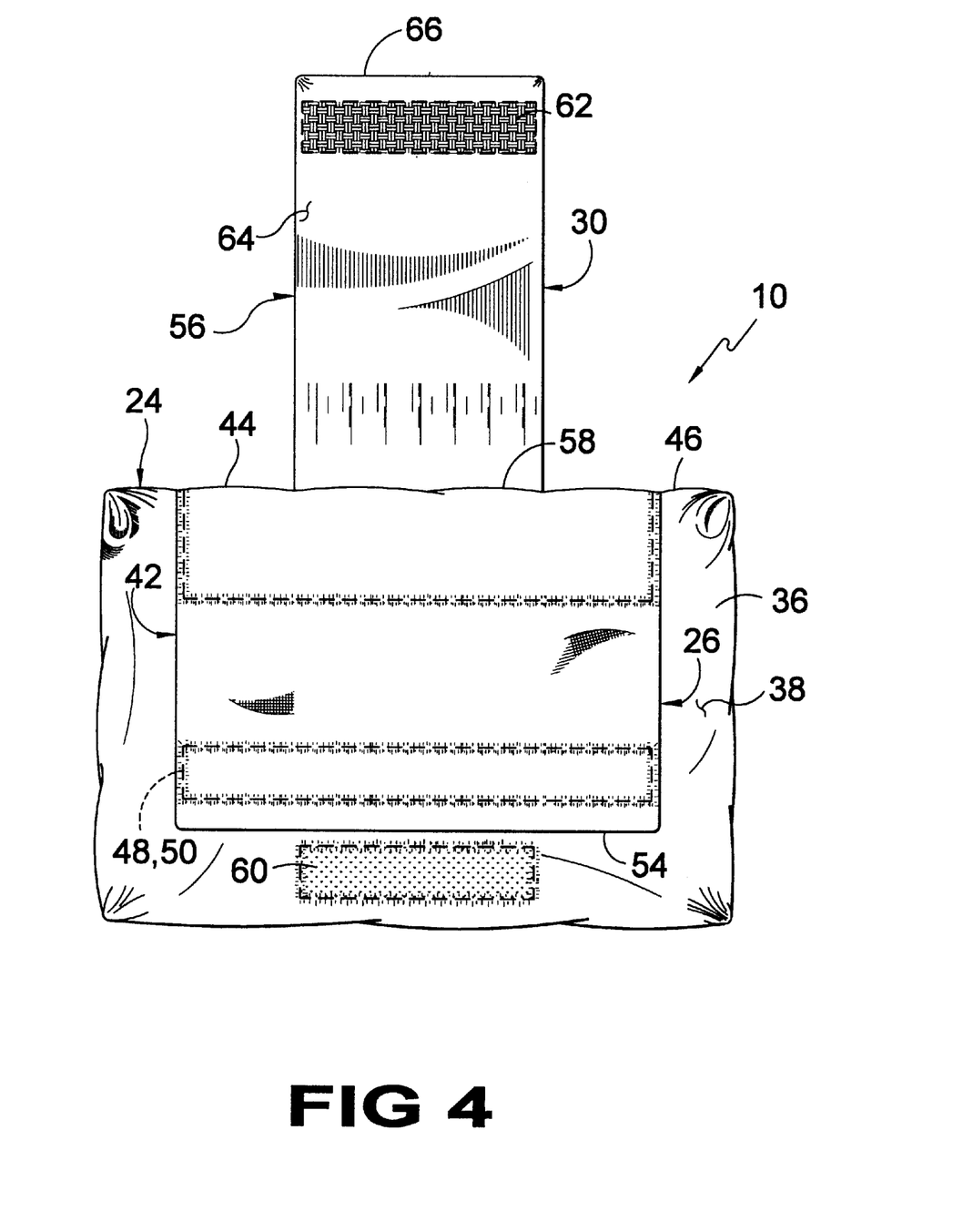
FIG. 4 is a front view similar to FIG. 3 with the upper flap opened and the lower flap closed.
Figure 5:
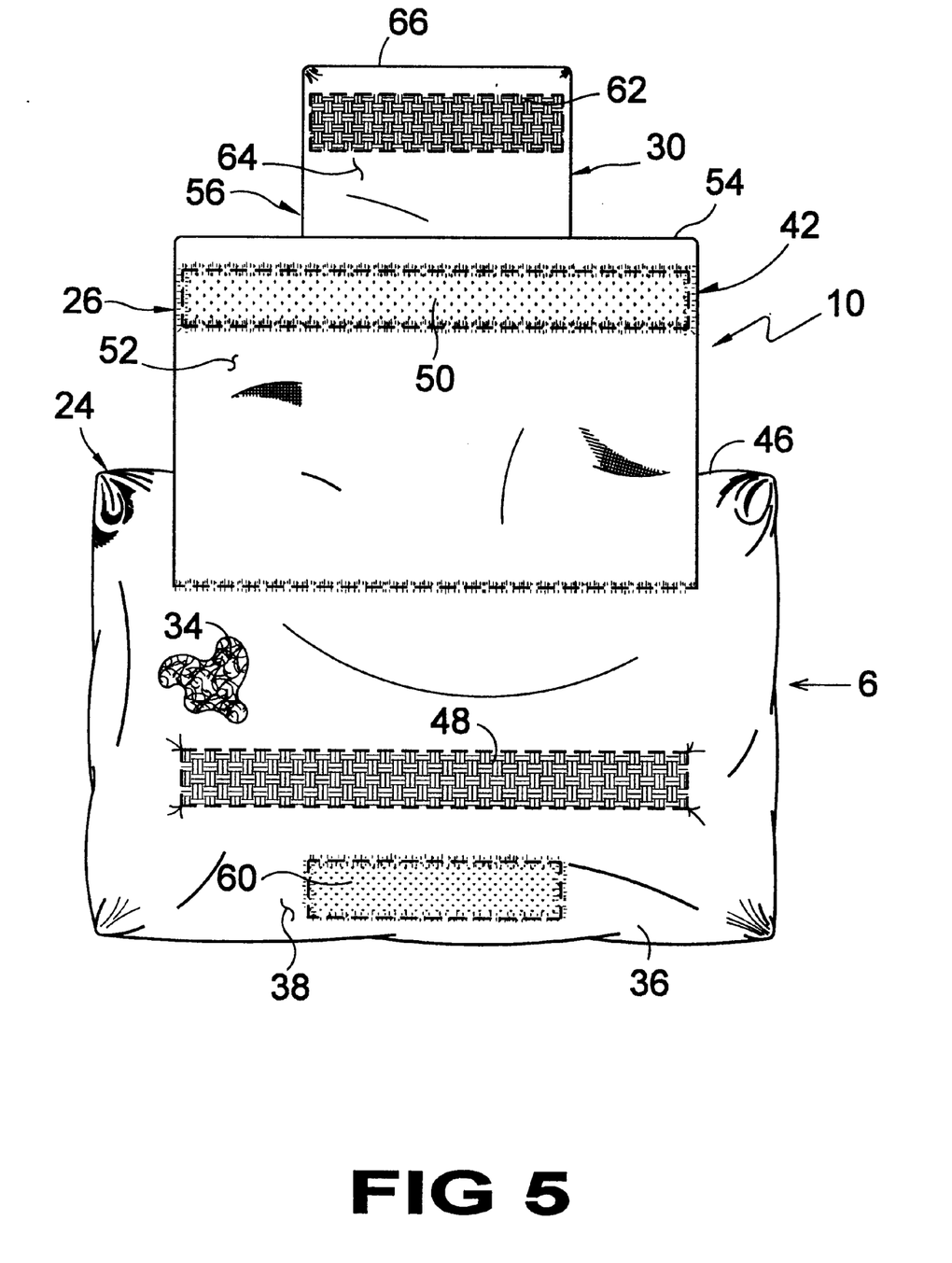
FIG. 5 is a front view similar to FIG. 4 with both the upper flap and lower flap opened.
Figure 6:
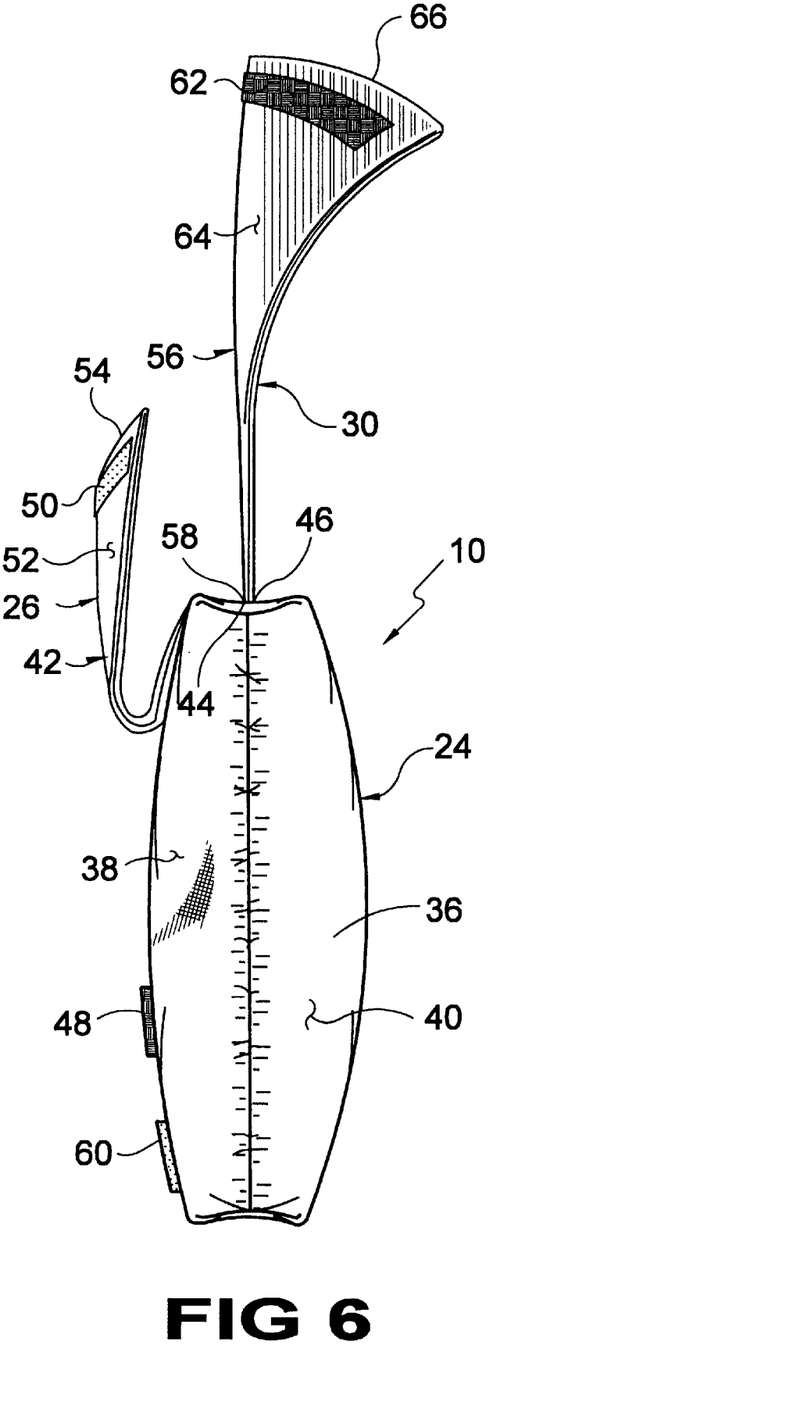
FIG. 6 is a side view taken in the direction of arrow 6 in FIG. 5.

Cushion 24 includes a resilient padding material 34 (see FIG. 5). Cushion 24 also contains a casing 36 having a front face 38 and a rear face 40, so that rear face 40 will bear against abdominal area 28 of child 12. Cushion 24 is in a generally rectangular shape configuration.

First releasably attaching means 26 consists of a lower flap 42 affixed at a first end 44 to a top seam edge 46 of cushion 24. Complementary hook and loop fastening elements 48, 50 are carried respectively by front face 38 of cushion 24 and an inner face 52 of lower flap 42 adjacent a second free end 54, so as to retain lower flap 42 in a closed condition over abdominal restraint strap 20 of seat belt 16. Second releasably attaching means 30 contains an upper flap 56 affixed at a first end 58 to the top seam edge 46 of cushion 24 over lower flap 42. Complementary hook and loop fastening elements 60,62 are carried respectively by front face 38 of cushion 24 and an inner face 64 of upper flap 56 adjacent a second free end 66, so as to retain upper flap 56 in a closed condition over chest restraint strap 22 of seat belt 16. Upper flap 56 is longer in length and narrower in width than lower flap 42. Upper flap 56 is centered over lower flap 42 with the second free end 66 of upper flap 56 extending just below the second free end 54 of lower flap 42 in the closed condition (see FIG. 3).

The operation of the padded cushioning device 10 will now be described. In operation, child 12 is placed into car seat 14 in a seated position. Both lower flap 42 and upper flap 56 are placed in an opened position. The abdominal restraint strap 20 is then secured to cushion 24 by closing lower flap 42 over abdominal restraint strap 20 with hook fastening element 48 mating with loop fastening element 50. Buckle 18 is then engaged and abdominal restraint strap 20 adjusted, so that rear surface 48 of cushion 24 rests comfortable against abdominal area 28 of child 12. The chest restraint strap 22 is then secured in place by closing upper flap 56 over chest restraint strap 22 with hook fastening element 60 mating with loop fastening element 62. The chest restraint strap 22 is adjusted, so that it will not engage with the skin of neck 32 of child 12. This eliminates the uncomfortable chaffing of the skin at the neck 32 and encourages child 12 not to complain or loosen seat belt 16 while no one is looking.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed is:

1. A padded cushioning device for use with a child strapped into a car seat by a seat having a buckle, an abdominal restraint strap and a chest restraint strap, said device comprising:

a) a cushion;

b) said cushion including first means for releasably attaching a portion of the abdominal restraint strap of the seat belt to said cushion, so that when the buckle of the seat belt is engaged, said cushion will be held against an abdominal area of the child in a comfortable manner when the child is seated in the car seat; and c) said cushion further including second means for releasably attaching a portion of the chest restraint strap of the seat belt to said cushion, so that the chest restraint strap will be positioned away from a neck of the child to eliminate uncomfortable chaffing of the skin on the neck;

d) said first releasably attaching means including a lower flap affixed at a first end to a top seam edge of said cushion and complementary hook and loop fastening elements carried respectively by a front face of said cushion and an inner face of said lower flap adjacent a second free end, so as to retain said lower flap in a closed position over the abdominal restraint strap of the seat belt; and e) said second releasably attaching means including an upper flap affixed at a first end to the top seam edge of said cushion over said lower flap and complementary hook and loop fastening elements carried respectively by the front face of said cushion and an inner face of said upper flap adjacent a second free end, so as to retain said upper flap in a closed condition over the chest restraint strap of the seat belt.

* * * * *